(12) United States Patent
Bharadwaj

(10) Patent No.: US 8,095,157 B2
(45) Date of Patent: Jan. 10, 2012

(54) SYSTEMS AND METHODS FOR BROADCASTING AND MULTICASTING SHORT MESSAGE SERVICE MESSAGES

(75) Inventor: Murali Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 11/552,423

(22) Filed: Oct. 24, 2006

(65) Prior Publication Data

US 2007/0281717 A1 Dec. 6, 2007

Related U.S. Application Data

(60) Provisional application No. 60/811,525, filed on Jun. 6, 2006.

(51) Int. Cl.
*H04W 4/00* (2009.01)
(52) U.S. Cl. ........ 455/466; 370/335; 370/312; 370/390; 709/227; 455/458; 455/435.1; 455/518; 455/515
(58) Field of Classification Search .......... 455/411–466; 370/390, 328, 335
See application file for complete search history.

(56) References Cited

U.S. PATENT DOCUMENTS

| | | | |
|---|---|---|---|
| 6,175,743 B1* | 1/2001 | Alperovich et al. | 455/466 |
| 6,611,510 B2* | 8/2003 | Marples et al. | 370/335 |
| 7,061,880 B2* | 6/2006 | Basilier | 370/312 |
| 7,573,837 B1* | 8/2009 | Mangal et al. | 370/260 |
| 2004/0076131 A1* | 4/2004 | Qu et al. | 370/335 |
| 2004/0203957 A1* | 10/2004 | George | 455/466 |
| 2005/0054353 A1* | 3/2005 | Mademann | 455/458 |
| 2005/0078676 A1* | 4/2005 | Bae et al. | 370/390 |
| 2005/0079867 A1* | 4/2005 | Balachandran et al. | 455/435.1 |
| 2005/0090276 A1* | 4/2005 | Rajkotia | 455/515 |
| 2005/0111394 A1* | 5/2005 | Jung et al. | 370/312 |
| 2006/0056419 A1 | 3/2006 | Eichler | |
| 2006/0148493 A1* | 7/2006 | Narasimha et al. | 455/458 |
| 2007/0049314 A1* | 3/2007 | Balachandran et al. | 455/518 |
| 2007/0156909 A1* | 7/2007 | Osborn et al. | 709/227 |
| 2007/0249379 A1* | 10/2007 | Bantukul | 455/466 |
| 2007/0254645 A1* | 11/2007 | Mistro | 455/426.1 |

FOREIGN PATENT DOCUMENTS

WO 03103308 12/2003
WO 2005122604 12/2005

OTHER PUBLICATIONS

3GPP2 X.P0042, Voice Call Continuity Between IMS and Circuit Switched Systems—Stage 2, Oct. 2005, Version: Proposed Baseline Text, pp. 36 and 37.*

(Continued)

*Primary Examiner* — Nick Corsaro
*Assistant Examiner* — Gerald Johnson
(74) *Attorney, Agent, or Firm* — Darren M. Simon

(57) ABSTRACT

A method for broadcasting a short message service (SMS) payload is disclosed. The SMS payload is sent to a home network. The SMS payload is encapsulated in a session initiation protocol (SIP) message. The SIP message is sent to a target user equipment (UE). A SIP response is received from the target UE. The SMS payload is extracted from the SIP message. The SMS payload is broadcasted to a plurality of mobile stations.

13 Claims, 14 Drawing Sheets

OTHER PUBLICATIONS

3GPP2 X.P0042, Voice Call Continuity Between IMS and Circuit Switched Systems—Stage Oct. 2, 2005, Version: Proposed Baseline Text, pp. 36 and 37.*

Ericsson: "Support for Interworking between IMS users and SMS users" 3GPP TSG SA WG2 Architecture, May 8-12, 2006 pp. 1-4, XP002471530.

International Search Report—PCT/US07/070528, International Search Authority, European Patent Office—Mar. 17, 2008.

Written Opinion—PCT/US07/070528, International Search Authority, European Patent Office—Mar. 17, 2008.

* cited by examiner

SYSTEMS AND METHODS FOR BROADCASTING AND MULTICASTING SHORT MESSAGE SERVICE MESSAGES

CLAIM OF PRIORITY UNDER 35 U.S.C. §119

This present Application for Patent claims priority to Provisional Application No. 60/811,525 entitled "Broadcast/multicast SMS for CDMA 1× EVDO Networks" filed Jun. 6, 2006, and assigned to the assignee hereof and hereby expressly incorporated by reference herein.

TECHNICAL FIELD

The present systems and methods relate generally to communications. More specifically, the present systems and methods relate to broadcasting and multicasting short message service (SMS) messages.

BACKGROUND

In a wireless communication system, a broadcast short message service (SMS) allows the transmission of short messages from a subscription service to a mobile unit. Generally, broadcast SMS messages are messages associated with services subscribed to by a user. Broadcast SMS may comprise entry features, administration features, or information messages. For example, a subscriber may subscribe to a stock quotes service wherein the subscriber may receive stock quotes on a wireless device or a mobile unit, such as a personal data assistant (PDA), laptop computer, a cellular telephone or a portable communication system (PCS) telephone, from a subscription service utilizing the wireless communication system.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communication (GSM), and Interim Standard 95 (IS-95).

A wireless telephony communication system may include a code division multiple access (CDMA) system. The IS-95 standard and its derivatives, IS-95A, IS-95B, IS-2000, proposed high-data-rate CDMA standards optimized for data, etc. These standards are promulgated by a Telecommunication Industry Association (TIA) and other well known standard bodies to specify the use of a CDMA over-the-air interface for cellular or PCS telephony communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for broadcasting a SMS payload is disclosed. In one configuration, the SMS payload is sent to a home network. The SMS payload is encapsulated in a session initiation protocol (SIP) message. The SIP message is sent to a target user equipment (UE). A SIP response is received from the target UE. The SMS payload is extracted from the SIP message. The SMS payload is broadcast to a plurality of mobile stations.

A computer readable medium is also disclosed. The medium is configured to store a set of instructions executable to: receive a short message service (SMS) payload; encapsulate the SMS payload in a session initiation protocol (SIP) message; send the SIP message to a target user equipment (UE); and receive a SIP response from the target UE.

Another computer readable medium is also disclosed. The medium is configured to receive a session initiation protocol (SIP) message, send a SIP response to a home network, extract a short message service (SMS) payload from the SIP message, and broadcast the SMS payload to a plurality of mobile stations.

A method for receiving a short message service (SMS) payload is also disclosed. A broadcast overhead message is received. A multicast internet protocol (IP) address included within the broadcast overhead message is retrieved. A broadcast channel associated with the multicast IP address is determined to be monitored. The associated broadcast channel is monitored. A broadcast message including the SMS payload is received.

A system that is configured to broadcast a short message service (SMS) payload is also disclosed. The system includes a means for processing and a means for sending the SMS payload to a home network. A means for encapsulating the SMS payload in a session initiation protocol (SIP) message and a means for sending the SIP message to a target user equipment (UE) are disclosed. A means for receiving a SIP response from the target UE and a means for extracting the SMS payload from the SIP message are disclosed. A means for broadcasting the SMS payload to a plurality of mobile stations is disclosed.

Various configurations of the systems and methods are now described with reference to the Figures, where like reference numbers indicate identical or functionally similar elements. The features of the present systems and methods, as generally described and illustrated in the Figures herein, could be arranged and designed in a wide variety of different configurations. Thus, the detailed description below is not intended to limit the scope of the systems and methods, as claimed, but is merely representative of the configurations of the systems and methods.

DETAILED DESCRIPTION

Figure 1:
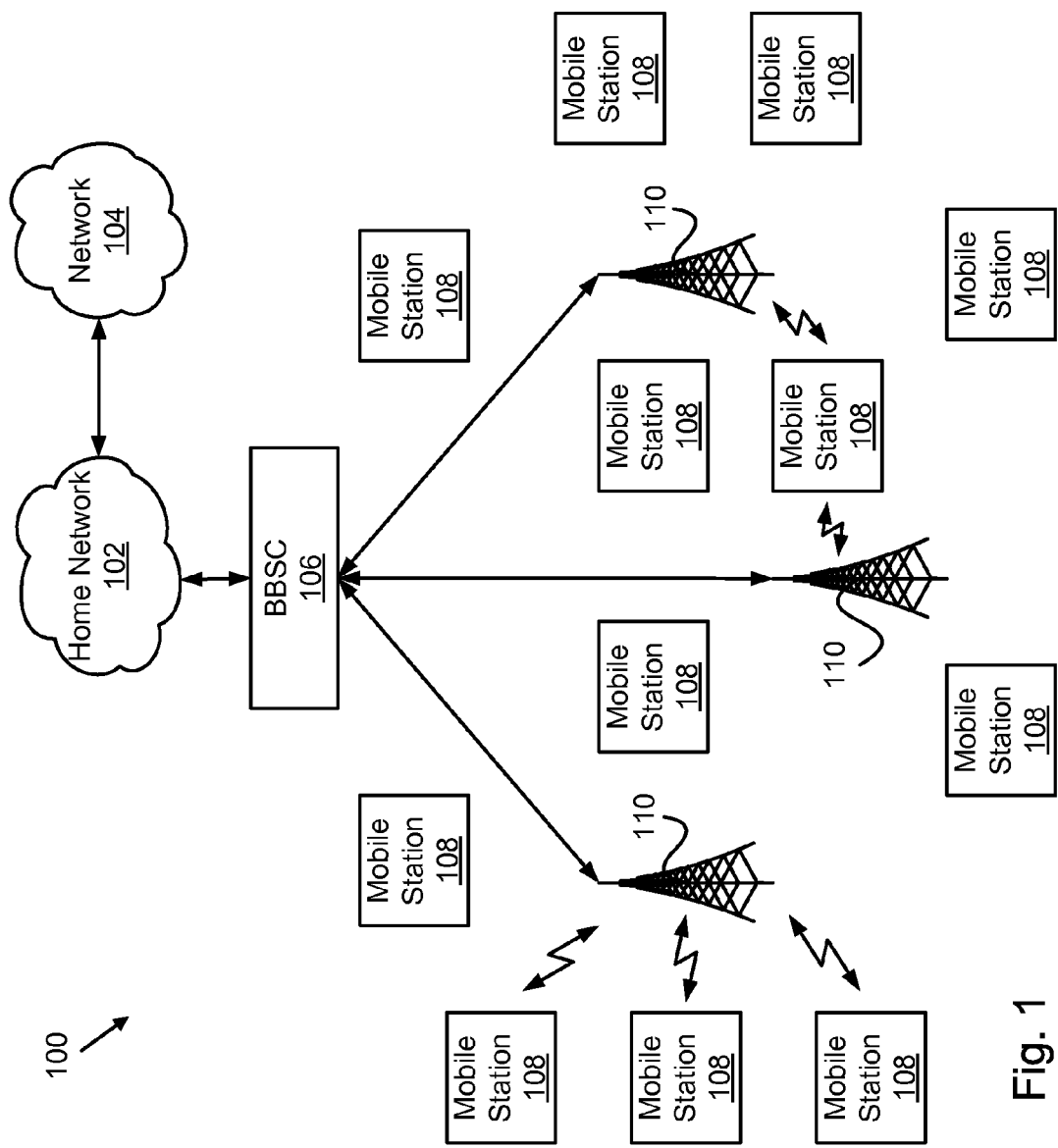
FIG. 1 illustrates one configuration of a wireless communication system.

Broadcasting and multicasting short message service (SMS) messages utilize over-the-air resources of the systems or networks that transmit the SMS messages. SMS messages may also be unicasted. The increase in the over-the-air resources used to unicast the messages may cause an inefficient use of the network capacity because a traffic channel for each recipient of the SMS message is established. This inefficiency may be overcome when a single broadcast/multicast channel is used to send the same SMS message to the recipients. As such, benefits may be realized by improved systems and methods for broadcasting and multicasting SMS messages using a code division multiple access 1× evolution data optimized (CDMA 1× EV-DO) network.

Many features of the configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "a configuration," "configuration," "configurations," "the configuration," "the configurations," "one or more configurations," "some configurations," "certain configurations," "one configuration," "another configuration" and the like mean "one or more (but not necessarily all) configurations of the disclosed systems and methods," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Short message service (SMS) messages may be broadcasted on 1× Evolution Data Optimized (EV-DO) networks by using supported EV-DO Broadcast-Multicast Services (BCMCS). Using supported EV-DO BCMCS to broadcast SMS messages may reduce over-the-air resources used by networks to broadcast SMS messages to mobile terminals, thereby providing carriers with a more efficient use of their network capacity. An efficient use of forward link capacity provided by the EV-DO BCMCS framework may be utilized.

SMS broadcast services may be used for broadcasting network information such as alerts to users in a sector, while multicast services may be restricted to pre-provisioned user groups. The EV-DO BCMCS framework may also utilize session initiation protocol (SIP) messages to encapsulate SMS messages that are communicated between Internet protocol multimedia subsystem (IMS) network entities and a broadcast network element (for example a broadcast base station controller (BBSC)) that interfaces with a EV-DO radio access network (RAN) and then utilize the BCMCS service provided by the broadcast network element to broadcast SMS data to mobile stations. SMS data may also be multicasted between pre-defined and pre-configured user groups.

Using the BCMCS framework to use a single broadcast channel to broadcast SMS data instead of setting up separate traffic channels to each mobile station interested in receiving the SMS data reduces network resource capacity usage. A significant reduction in resource usage may result in a capacity gain for the network.

FIG. 1 illustrates one configuration of a wireless communication system 100. In one aspect, the system 100 is a code division multiple access (CDMA) wireless communication system. In further configurations, the system 100 may utilize other transmission modulation schemes such as time division multiple access (TDMA) and frequency division multiple access (FDMA) as well as other spread spectrum systems.

As illustrated in FIG. 1, the system 100 may include a plurality of mobile stations 108, a plurality of base stations 110, a broadcast base station controller (BBSC) 106, and a home network 102. In one configuration, the home network 102 may be configured to interface with a network 104. In one configuration, the network 104 may include an ANSI-41 network. The home network 102 may also be configured to interface with the BBSC 106.

The BBSC 106 may be coupled to each of the base stations 110 via backhaul lines. The backhaul lines may support any one of several interfaces, including, e.g., E1/T1, asynchronous transfer mode (ATM), Internet protocol (IP), point-to-point protocol (PPP), Frame Relay, high data rate digital subscriber line (HDSL), asymmetric digital subscriber line (ADSL), or digital subscriber line (xDSL). In one configuration, the system 100 may include more than one BBSC 106.

In one aspect, each base station 110 may include at least one sector (not shown). Each sector may include an omnidirectional antenna or an antenna pointed in a particular direction radially away from the base station 110. Alternatively, each sector may include two antennas for diversity reception. Each base station 110 may advantageously be designed to support a plurality of frequency assignments. The intersection of a sector and a frequency assignment may be referred to as a CDMA channel. The base station 110 may also be known as base station transceiver subsystems (BTSs) 110. Alternatively, "base station" may be used in the industry to refer collectively to a BSC 110 and one or more BTSs 110. The BTSs 110 may also be denoted as "cell sites." Alternatively, individual sectors of a given BTS 110 may be referred to as cell sites. The mobile stations 108 may be typically cellular or personal communications service (PCS) telephones. The system 100 may be advantageously configured for use in accordance with an IS-95 standard.

During operation of the cellular telephone system, the base stations 110 may receive sets of reverse link signals from sets of mobile stations 108. The mobile stations 108 may be conducting telephone calls or other communications. Each reverse link signal received by a given base station 110 may be processed within that base station 110. The resulting data may be forwarded to the BBSC 106. The BBSC 106 may provide call resource allocation and mobility management functionality including the orchestration of soft handoffs between base stations 110. The BBSC 106 may also route the received data to the home network 102, which may provide additional routing services for interface with the network 104. Similarly, the network 104 may interface with the home network 102, and the home network 102 may interface with the BBSC 106, which in turn may control the base stations 110 to transmit sets of forward link signals to sets of the mobile stations 108.

Figure 2:
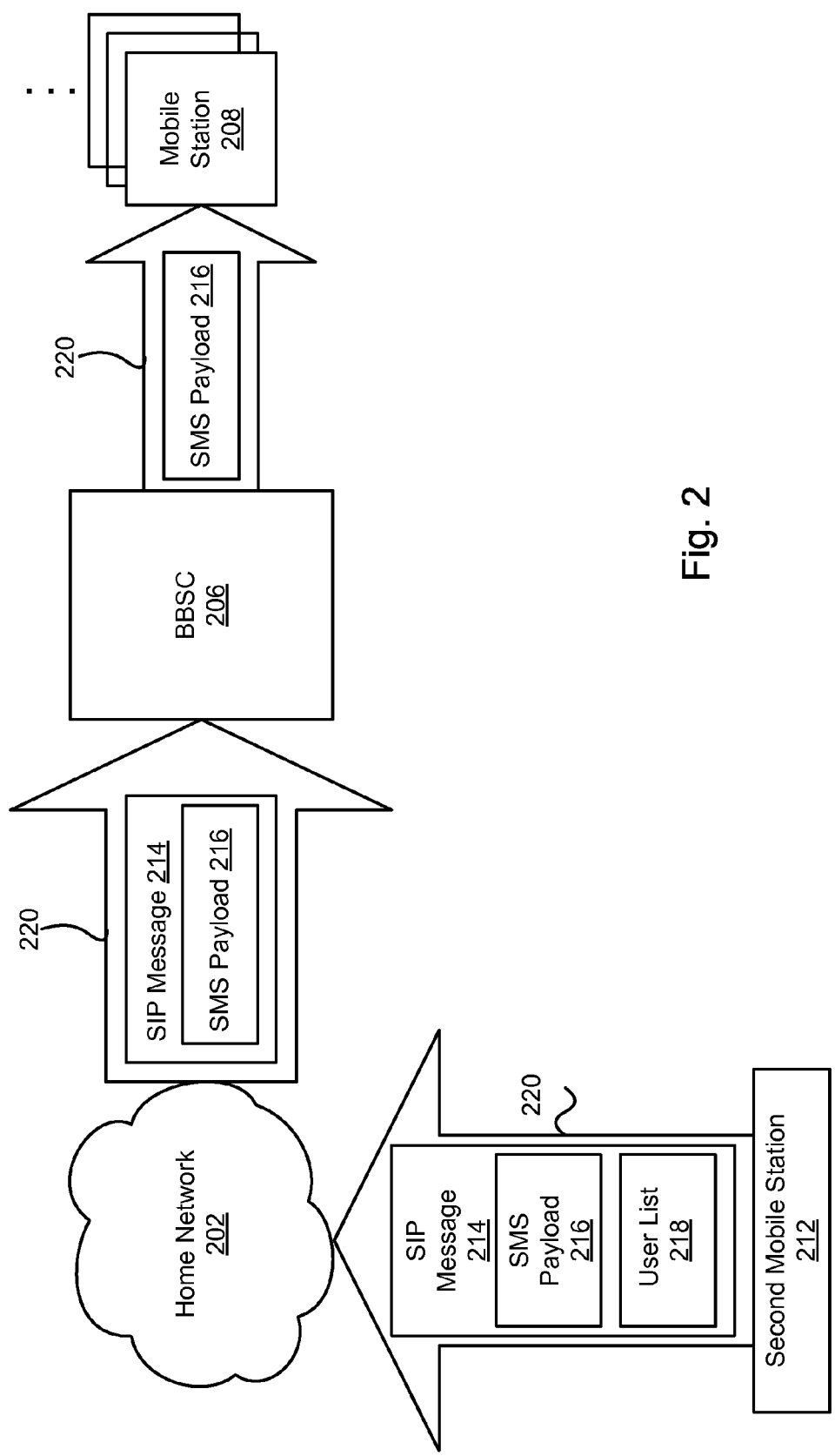
FIG. 2 illustrates one configuration of a home network sending information to a plurality of mobile stations.

FIG. 2 illustrates one configuration of the home network 202 sending information to a plurality of mobile stations 208. In one configuration, the home network 202 transmits a short message service (SMS) payload 216 to the plurality of mobile stations 208. The SMS is a service available on devices such as the mobile stations 208. The SMS service may also be available on other handheld devices, landline telephones, and the like. The SMS permits the sending of text messages between mobile stations 208. The SMS payload 216 may be encapsulated within a session initiation protocol (SIP) message 214. The SIP message 214 may be an application-layer control protocol for creating, modifying, and terminating sessions with one or more participants. These sessions may include Internet telephone calls, multimedia distribution, and multimedia conferences. In one configuration, the home network 202 may receive the SIP message 214 from another device (not shown) over an ANSI-41 network. The SIP message 214 may be transmitted from the home network 202 to the BBSC 206 over a carrier's backhaul network 220 which may connect the BBSC 206 with the remainder of core network entities. The BBSC 206 may extract the SMS payload 216 from the SIP message 214 and transmit the SMS payload 216 to the plurality of mobile stations 208 using CDMA 1× EVDO BCMCS. In one configuration, the BBSC 206 transmits the SMS payload 206 over the carrier's backhaul network 220.

In a further configuration, the home network 202 may receive the SIP message 214 from a second mobile station 212. The SIP message 214 may include a target SMS user list 218 in addition to the SMS payload 216. The target SMS user list 218 may specify a specific plurality of mobile stations 208 that should receive the SMS payload 216.

Figure 3:
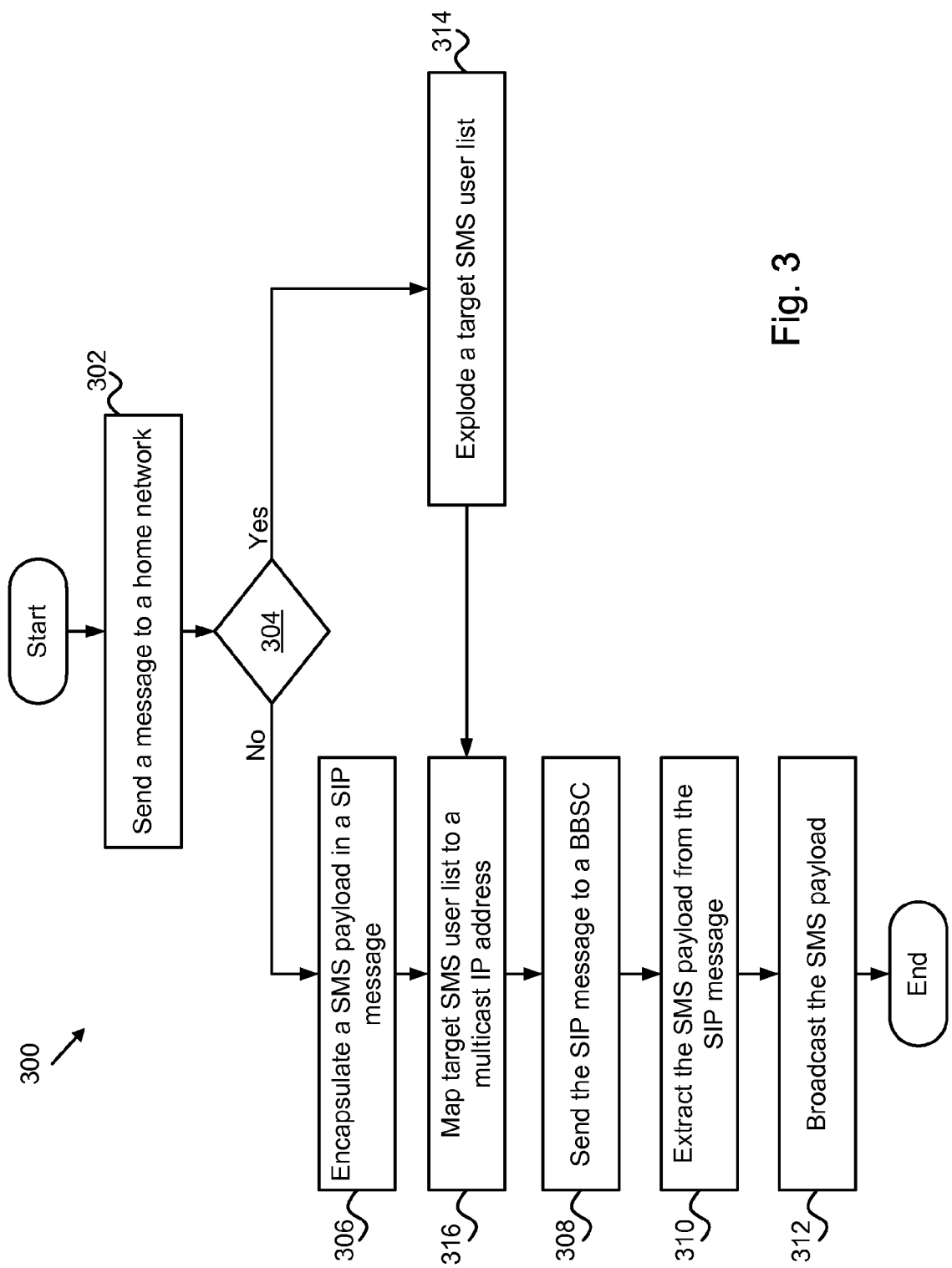
FIG. 3 is a flow diagram illustrating a method to broadcast a short message service (SMS) message.

FIG. 3 is one configuration of a flow diagram illustrating a method 300 to broadcast the SMS payload 216. In one configuration, a message is sent 302 to the home network 102. If the message is not 304 a SIP message 214, the SMS payload 216 may be encapsulated 306 within a SIP message 214. In one configuration, the SIP message 214 may include the target SMS user list 218 and the SMS payload 216. The target SMS user list 218 may be mapped 316 to a multicast IP address. The SIP message 214 may be sent 308 to the BBSC 106, and the SMS payload 216 may be extracted 310 from the SIP message 214. The SMS payload 216 may then be broadcasted 312. In one configuration, the SMS payload 216 may be broadcast 312 to the plurality of mobile stations 208.

Alternatively, the home network 102 may determine 304 that the message is a SIP message 214. In one configuration, the SIP message 214 may include the target SMS user list 218 and the SMS payload 216. In one configuration, the SIP message 214 is received and the target SMS user list 218 is exploded 314 from the SIP message 214. The target SMS user list 218 may be mapped 316 to a multicast IP address. The SIP message 214 may be sent 308 to the BBSC 106 and the SMS payload 216 may be extracted 310 from the SIP message 214. The SMS payload 216 may be broadcasted 312. In one configuration, the SMS payload 312 may be broadcast 312 to the multicast IP address mapped 316 to the target SMS user list 218.

Figure 4:
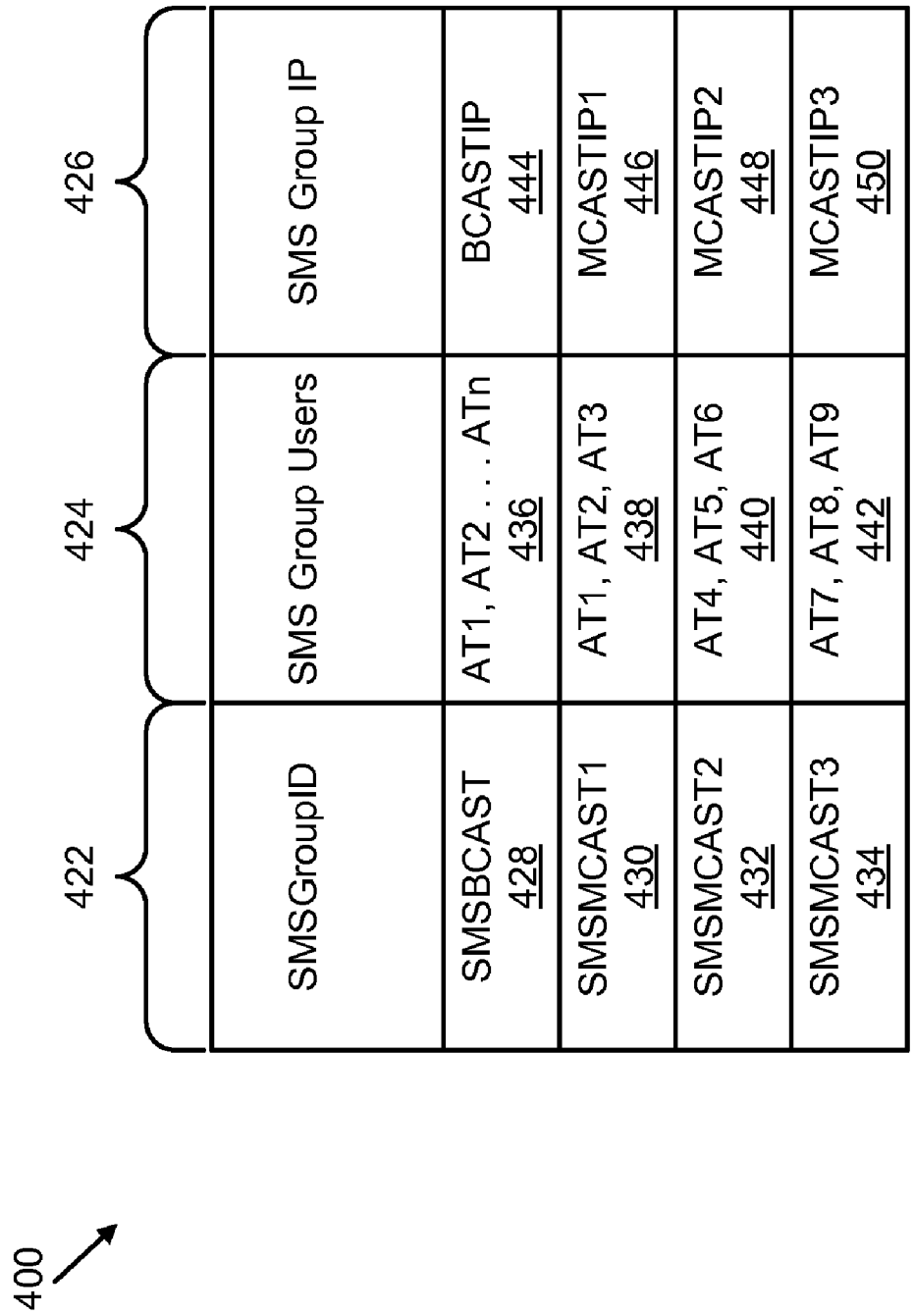
FIG. 4 is one configuration of a static table including pre-provisioned groups of mobile stations.

FIG. 4 illustrates one configuration of a static table 400 which may include pre-provisioned groups of mobile stations 208. In the depicted Figure, the groups of mobile stations 208 may be associated with an SMS group users category 424. The table 400 may also include an SMSGroupID category 422 and an SMS Group IP category 426. In one configuration, the mobile stations 208 may be classified in various user groups within the static table 400.

The SMS group users category 424 may include pre-provisioned groups of mobile stations 208. In one configuration, mobile stations 208 may be referred to as access terminals (AT). A first AT group 436 of access terminals included in the SMS group users category 424 may include each AT included in a network system. For example, the first AT group 436 may include AT1, AT2, . . . ATn, where there are "n" access terminals in the network system. A second AT group 438 may include a subset of access terminals, such as AT1, AT2 and AT3. A third AT group 440 may also include a subset of access terminals, such as AT4, AT5 and AT6. Similarly, a fourth AT group 442 may include a subset of access terminals, for example, AT7, AT8 and AT9.

The SMSGroupID category 422 may include an identification corresponding to a particular AT group. For example, a first identification SMSBCAST 428 may correspond to the first AT group 436. A second identification SMSMCAST1 430 may be associated with the second AT group 438. A third identification SMSMCAST2 432 may correspond to the third AT group 440. Similarly, a fourth identification SMSMCAST3 434 may be associated with the fourth AT group 442.

The SMS Group IP category 426 may include an IP address associated with each SMS group within the SMS group users category 424. In one configuration, the IP address may include a broadcast IP address which may facilitate each AT in the system to receive a SMS payload 216. In a further configuration, the IP address may include a multicast IP address which facilitates a subset of the ATs to receive the SMS payload 216. A first address BCASTIP 444 may correspond to the first AT group 436. A second address MCASTIP1 446 may be associated with the second AT group 438. Further, a third address MCASTIP2 448 may correspond to the third AT group 440. Similarly, a fourth address MCASTIP3 450 may be associated with the fourth AT group 442.

Figure 5:
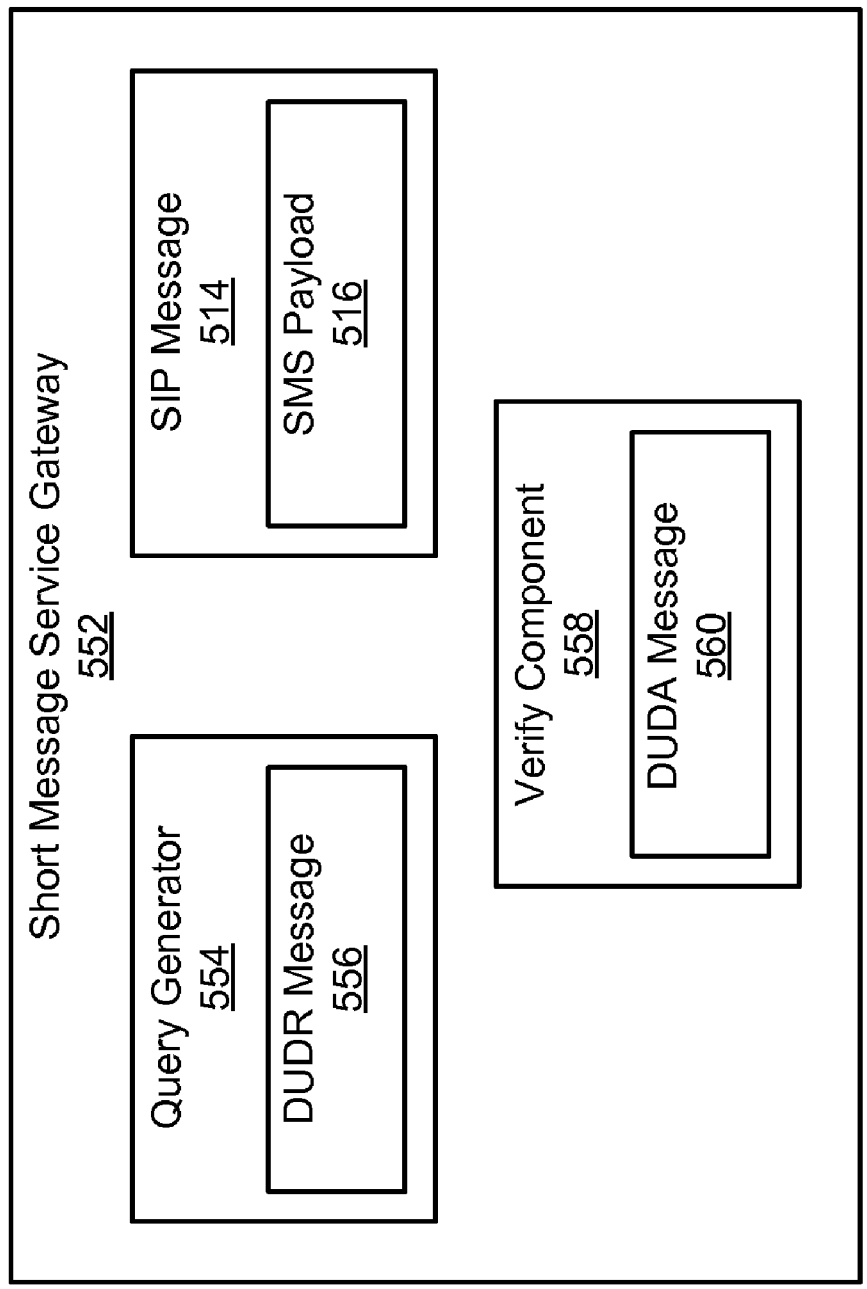
FIG. 5 is a block diagram illustrating one configuration of a short message service gateway (SMS-GW)

FIG. 5 is a bock diagram illustrating one configuration of a short message service gateway (SMS-GW) 552. The SMS-GW 552 may be implemented in the home network 102 and may facilitate receiving an SMS payload 516 and transmitting the SMS payload 516 to the BBSC 106. The SMS-GW 552 may include a query generator 554. The generator 554 may generate a query regarding the status of the BBSC 106. In one configuration, the query generator 554 may generate a diameter user-data-request (DUDR) message 556. The DUDR message 556 may allow the SMS-GW 552 to query whether or not the BBSC 106 is registered on a particular subsystem. The SMS-GW 552 may also include a verify component 558 which verifies if the BBSC 106 is registered on the particular subsystem. The verify component 558 may include a diameter user-data-answer (DUDA) message 560 which may indicate if the BBSC 106 is registered. The SMS-GW 552 may further include the SMS payload 516. In one configuration, the SMS payload 516 may be encapsulated in a SIP message 514.

Figure 6:
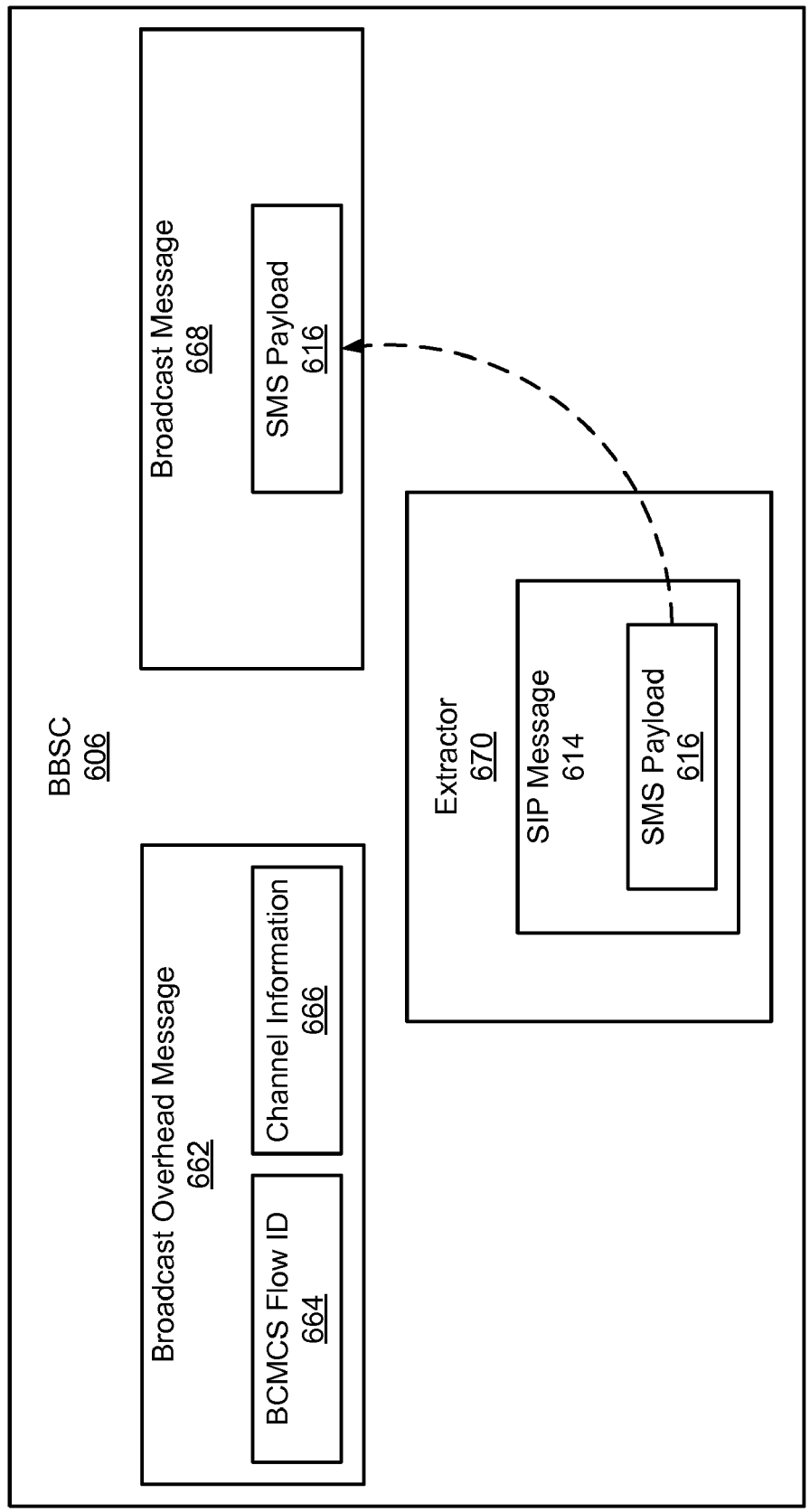
FIG. 6 is a block diagram illustrating one configuration of a broadcast base station controller (BBSC)

FIG. 6 is a block diagram illustrating one configuration of the BBSC 606. The BBSC 606 may receive an SMS payload 616 and broadcast the SMS payload 616. The BBSC 606 may include a broadcast overhead message (BOM) 662. The BOM 662 may include broadcast multicast services flow identification (BCMCS Flow ID) 664. The BCMCS Flow ID 664 may include information regarding the IP address to which the SMS payload 616 is broadcasted. In one configuration, the BCMCS Flow ID 664 may be associated with a multicast IP address to which the SMS payload 616 may be sent. The BOM 662 may also include channel information 666 which may be information pertaining to the broadcast channel on which the BBSC 606 broadcasts the SMS payload 616.

The BBSC 606 may also include an extractor 670 which serves to extract the SMS payload 616 which is encapsulated within an SIP message 614. The extracted SMS payload 616 may then be included in a broadcast message 668. The BBSC 606 may broadcast the broadcast message 668 with the SMS payload 616 to a plurality of access terminals. In a further configuration, the BBSC 606 may multicast the broadcast message 668 with the SMS payload 616 to a pre-provisioned group of access terminals.

Figure 7:
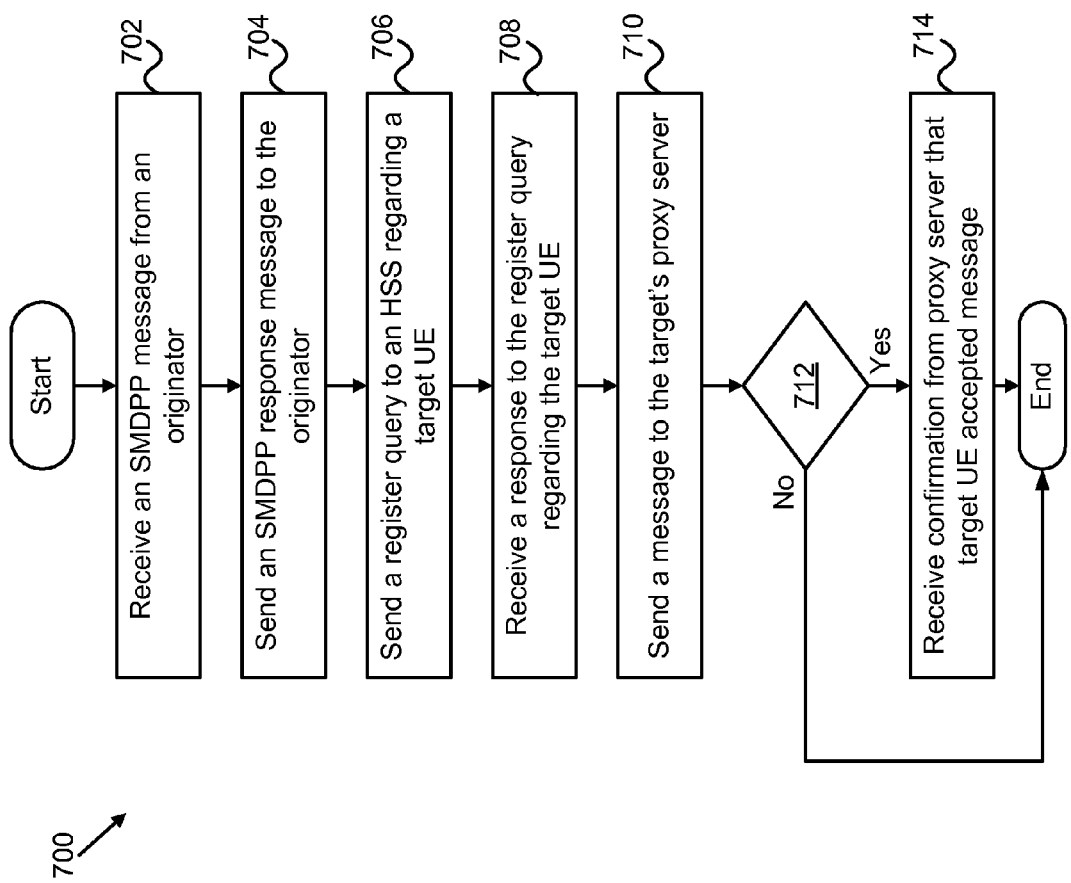
FIG. 7 is a flow diagram illustrating one configuration of a method to send a message to a target user equipment (UE)

FIG. 7 is a flow diagram illustrating one configuration of a method 700 to send a message to target user equipment (UE). In one configuration, the message may include the SMS payload 216. The method 700 may be implemented by the SMS-Gateway (GW) 552. As previously explained, the SMS-GW 552 may be implemented in the home network 102 and the SMS-GW may facilitate receiving the SMS payload 216 and transmitting the SMS payload 216 to the BBSC 106.

The SMS-GW 552 may receive 702 a short message service delivery point to point (SMDPP) message from an originator. In one configuration, the originator may be a second SMS-GW. The SMS-GW 552 may send 704 a SMDPP response to the originator to indicate that the SMDPP message was received. The SMS-GW 552 may send 706 a register query to a home subscriber service (HSS) regarding the target UE. In one configuration, the target UE may include the BBSC 106. The register query may be generated by the query generator 554 and may include a DUDR 556 as to whether or not the target UE is registered on an IP Multimedia Subsystem (IMS). The IMS may include a next generation networking (NGN) architecture that facilitates providing mobile and fixed multimedia services.

The SMS-GW 552 may receive 708 a response to the register query regarding the target UE indicating that the target UE is registered on the IMS. The response may include a DUDA 560 as previously described. The SMS payload 216 may be sent 710 to a proxy server of the target UE. In one configuration, the SMS payload 216 may be sent 710 encapsulated in a SIP message 214 and using SIP messaging technology. If the SIP message 214 is not 712 accepted by the target UE, the method 700 ends. If the target UE does 712 accept the SIP message 214, the SMS-GW 552 may receive 714 a confirmation from the proxy server that the target UE accepted the SIP message 214.

Figure 8:
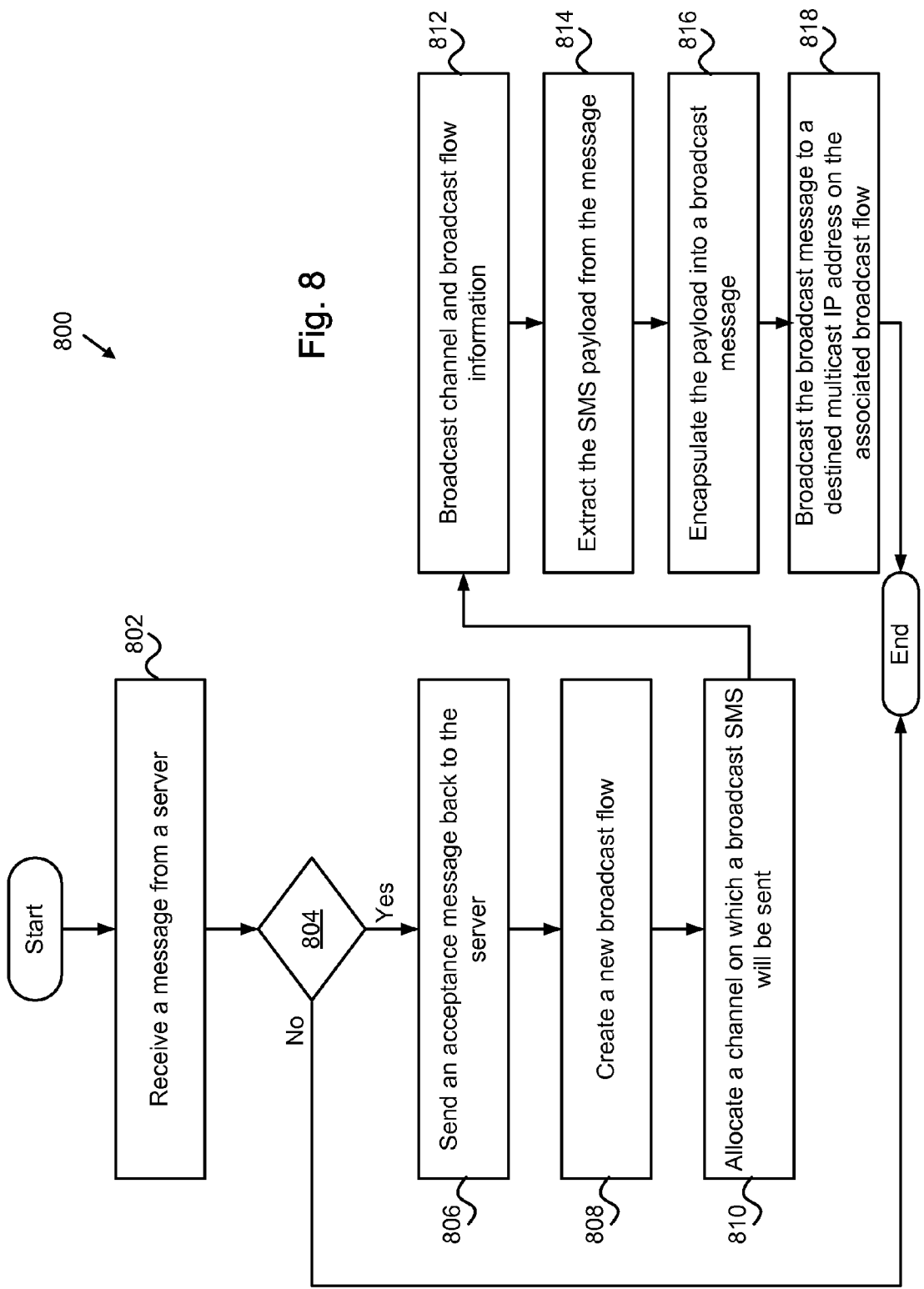
FIG. 8 is a flow diagram illustrating one configuration of a method to broadcast a broadcast message.

FIG. 8 is a flow diagram illustrating one configuration of a method 800 to broadcast the broadcast message 668 which may include SMS payload 216. In one configuration, the method 800 may be implemented by the BBSC 106. The BBSC 106 may receive 802 a message from a server. In one configuration, the message may include a SIP message 214 and the server may include a SIP server. The SIP message 214 may include the SMS payload 216.

The BBSC 106 decides 804 whether or not to accept the message. If the BBSC 106 determines 804 to not accept the message, the method 800 ends. If the BBSC 106 determines 804 to accept the message, an acceptance message may be sent 806 back to the server.

The BBSC 106 may create 808 a new broadcast flow. The new broadcast flow may be utilized to broadcast the SMS payload 216. The new broadcast flow may include the BCMCS Flow ID 664 described previously. In one configuration, a channel may be allocated 810 on which the SMS payload 216 will be broadcasted. Information regarding the channel allocation and the broadcast flow may be broadcasted 812. In one configuration, the channel and broadcast flow information may be broadcasted to a plurality of access terminals (mobile stations). The SMS payload 216 may be extracted 814 from the message and the SMS payload 216 may be encapsulated 816 into the broadcast message 668. The broadcast message 668, including the SMS payload 216, may be broadcasted 818 to a destined multicast IP address on the associated broadcast flow.

Figure 9:
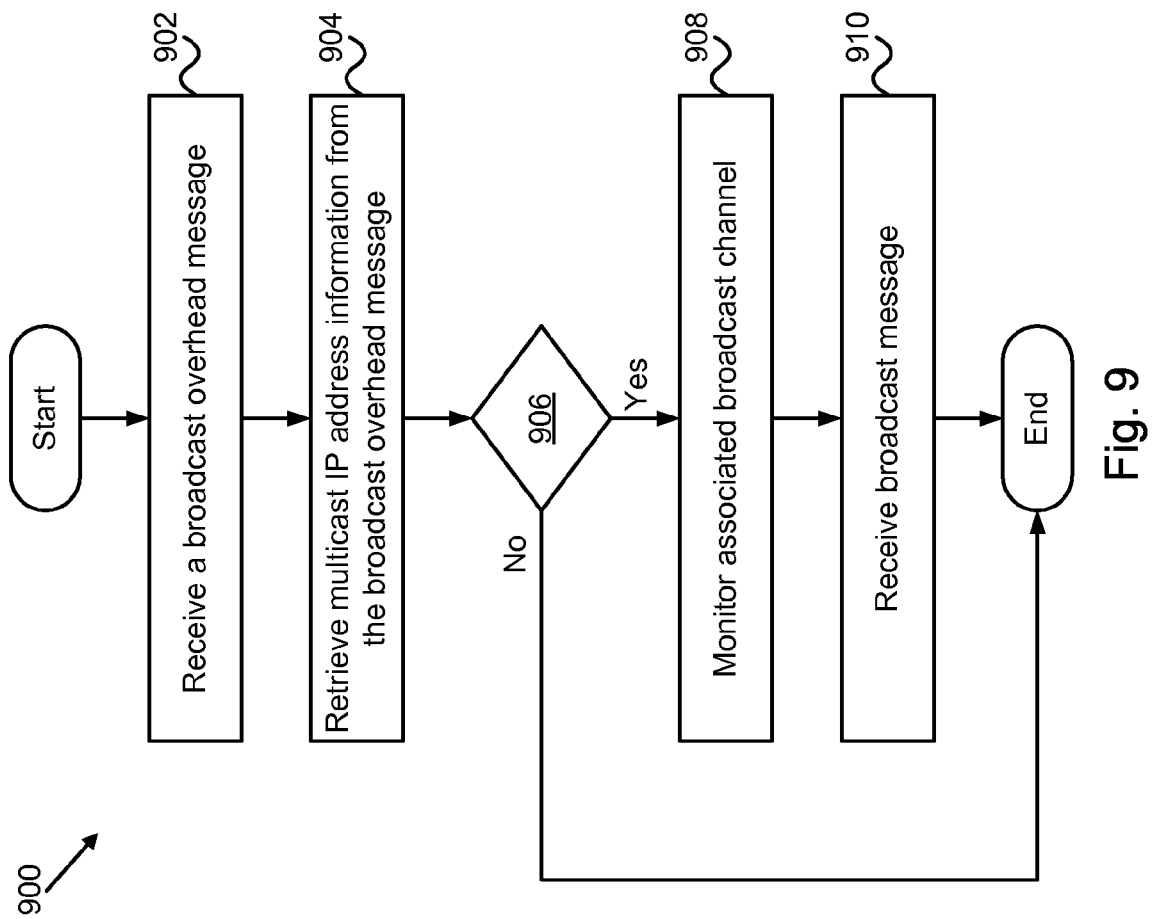
FIG. 9 is a flow diagram illustrating one configuration of a method to receive the broadcast message.

FIG. 9 is a flow diagram illustrating one configuration of a method 900 of receiving the broadcast message 668 which may include the SMS payload 216. In one configuration, an access terminal (mobile station) may implement the method 900. The access terminal may receive 902 the broadcast overhead message (BOM) 662. As previously explained, the BOM 662 may include channel information 666 and the BCMCS Flow ID 664. The access terminal may retrieve 904 multicast IP address information from the BOM 662. The multicast IP address information may include a multicast IP address associated with an SMS group users category 424.

The access terminal may determine 906 whether or not to monitor the channel identified by the channel information 666 included in the BOM 662. In one configuration, the access terminal may monitor the channel in order to retrieve the SMS payload 216. The access terminal may utilize the static table 400 in order to determine 906 whether or not to monitor the channel. If the access terminal is subscribed to a group associated with the multicast IP address, the access terminal may monitor 908 the broadcast channel associated with the multicast IP address. For example, the multicast IP address may be the second address MCASTIP1 446 from FIG. 4. The access terminal may subscribe to the second AT group 438 which may correspond to the second address MCASTIP1 446. As such, the access terminal may determine 906 to monitor 908 the broadcast channel associated with the second address MCASTIP1 446. The access terminal may receive 910 the broadcast message 668 which may include the SMS payload 216.

Alternatively, the access terminal may determine 906 to not monitor the broadcast channel. In one configuration, the access terminal may not subscribe to a SMS Group which corresponds to the multicast IP address included in the BOM 662. If the access terminal determines 906 to not monitor the channel, the method 900 ends.

Figure 10:
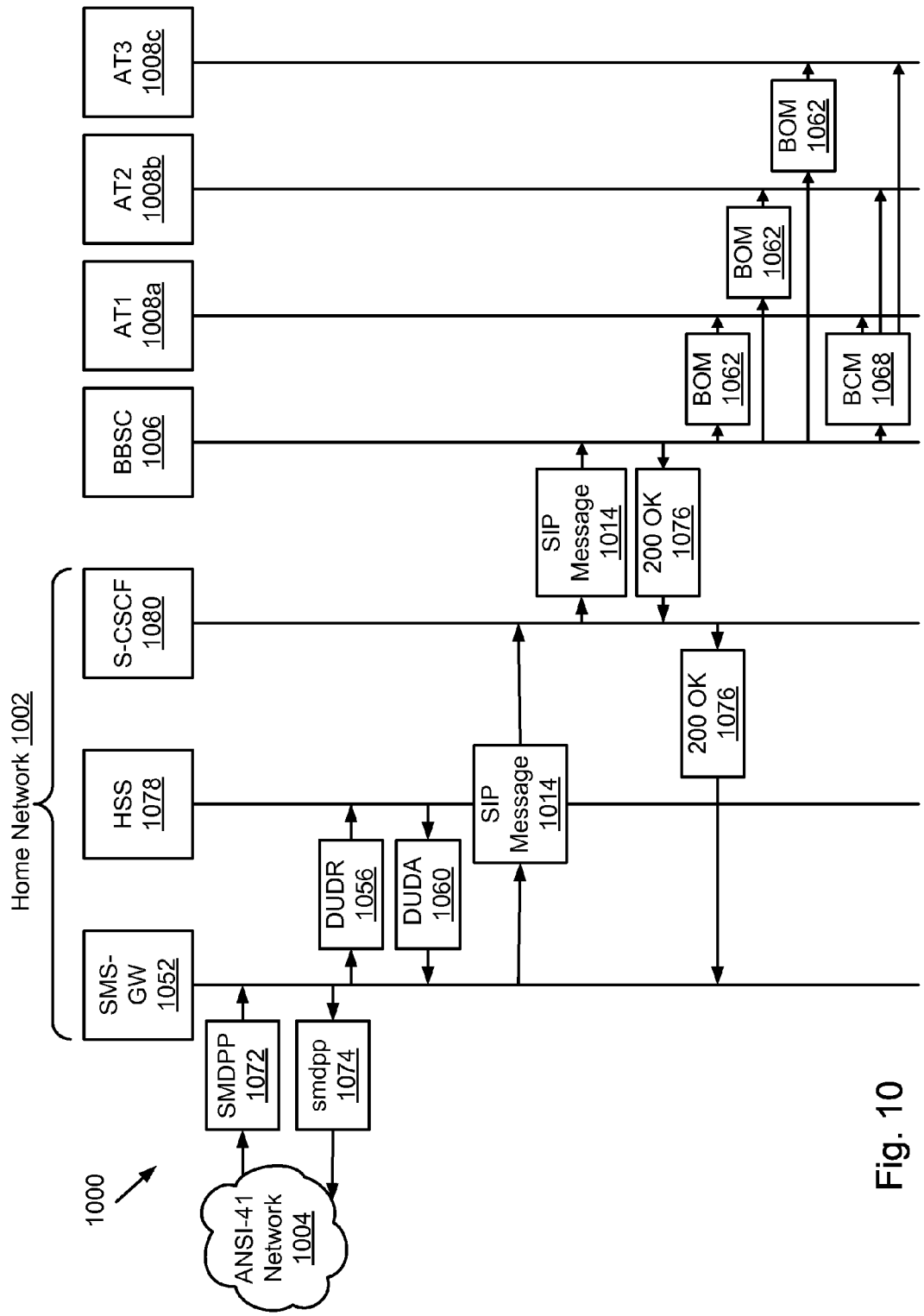
FIG. 10 is a thread diagram illustrating one configuration of a method to send and receive SMS data.

FIG. 10 is a thread diagram illustrating one method 1000 of sending and receiving SMS data. The SMS data may include the SMS payload 216. The SMS-GW 1052 may receive an ANSI-41 SMDPP message 1072 from an originating SMS-GW. The originating SMS-GW is not shown for brevity. The SMDPP message 1072 may be sent over an ANSI-41 network 1004. The SMS-GW 1052 may respond by sending an ANSI-41 SMDPP response 1074 back to the originating SMS-GW over the ANSI-41 network 1004. In one configuration, the SMDPP message 1072 may include the SMS payload 216.

The SMS-GW 1052 may be provisioned to use IMS. In one configuration, the SMS-GW 1052 may send the DUDR message 1056 to a home subscriber service (HSS) 1078 in order to determine whether or not the target UE is IMS registered. In the depicted thread diagram and the corresponding discussion, the target UE may be the BBSC 1006. However, the target UE may be any other type of computing device. If the BBSC 1006 is IMS registered, the HSS 1078 may respond by sending a DUDA message 1060 to the SMW-GW 1052 indicating that the BBSC 1006 is IMS registered. The HSS 1078 may also return the address of a serving call session control function (S_CSCF) 1080 associated with the BBSC 1006. The S-CSCF 1080 may be a SIP server and will be more fully explained below in association with FIG. 11. In one configuration, the SMS-GW 1052, the HSS 1078 and the S-CSCF 1080 may be included in a home network 1002.

The SMS-GW 1052 may send a SIP message 1014 to the address of the S-CSCF 1080 associated with the BBSC 1006. The SIP message 1014 may include the SMS payload 216. In one configuration, a content-type value associated with the SIP message 1014 may be "application/vnd.3gpp2.sms." In a further configuration, the SMS payload 216 included in the SIP message 1014 may include a binary encoded SMS transport layer message as described in the standards document, "3GPP2 C.S0015-0 v1.0."

The S-CSCF 1080 may forward the SIP message 1014 to the BBSC 1006 via the proxy call session control function (P-CSCF) associated with the BBSC 1006. The P-CSCF is not shown in the depicted illustration for brevity. The BBSC 1006 may respond by sending a SIP 200 OK message 1076 back to the SMS-GW 1052 via the P-CSCF (not shown) and the S-CSCF 1080 associated with the BBSC 1006. The SIP 200 OK message 1076 may be a SIP response used by the Session Initiation Protocol to indicate a successful response by the recipient of the message. The S-CSCF 1080 may forward the SIP 200 OK message 1076 to the SMS-GW 1052.

In one configuration, the BBSC 1006 may create a new broadcast flow which may be utilized to broadcast the SMS payload 216. In one configuration, the new broadcast flow may be the BCMCS Flow ID 664 which may include a multicast IP address. The BBSC 1006 may also allocate a channel on which the SMS payload 216 is sent. In one aspect, an interlace-multiplex pair may denote available broadcast channels on the system. In other words, each interlace-multiplex pair may point to a separate broadcast channel. In one configuration, the BBSC 1006 allocates the interlace-multiplex pair on which the broadcast SMS payload 216 is sent. The interlace-multiplex pair and broadcast flow information may be broadcasted to the access terminals in the sector of the BBSC 1006 using a BOM 662. In one configuration, the BOM 662 may include channel information regarding the interlace-multiplex pair and the BOM 662 may also include the broadcast flow information. The BBSC 1006 may transmit the BOM 662 to AT1 1008a, AT2 1008b and AT3 1008c.

The BBSC 1006 may also extract the SMS payload 216 from the SIP message 1014. In one configuration, the BBSC 1006 may encapsulate the SMS payload 216 into a broadcast message (BCM) 1068. The BBSC 1006 may send the BCM 1068 to the destined multicast IP address included in the associated broadcast flow.

The access terminals within the sector of the BBSC 1006 (AT1 1008a, AT2 1008b and AT3 1008c) that received the BOM 1068 may retrieve the multicast IP address information that may be embedded within the BCMCS Flow ID 664. AT1 1008a, AT2 1008b and AT3 1008c may decide to monitor the associated broadcast channel (identified by the interlace-multiplex pair) if they desire to receive the BCM 1068 which may include the SMS payload 216. AT1 1008a, AT2 1008b and AT3 1008c may utilize the static table 400 to determine which SMS Group Users they are subscribed to before determining whether or not to monitor the associated broadcast channel. The access terminals that decide to monitor the broadcast channel may receive the BCM 1068 with the included SMS payload 216.

For example, AT1 1008a may retrieve the multicast IP address information and discover that the multicast IP address is a second address MCASTIP1 446. AT1 1008a may utilize the table 400 to determine that it 1008a is subscribed to the second AT group 438 which corresponds to the SMS Group IP address MCASTIP1 446. As such, AT1 1008a may monitor the associated broadcast channel in order to receive the BCM 1068 and the embedded SMS payload 216.

Figure 11:
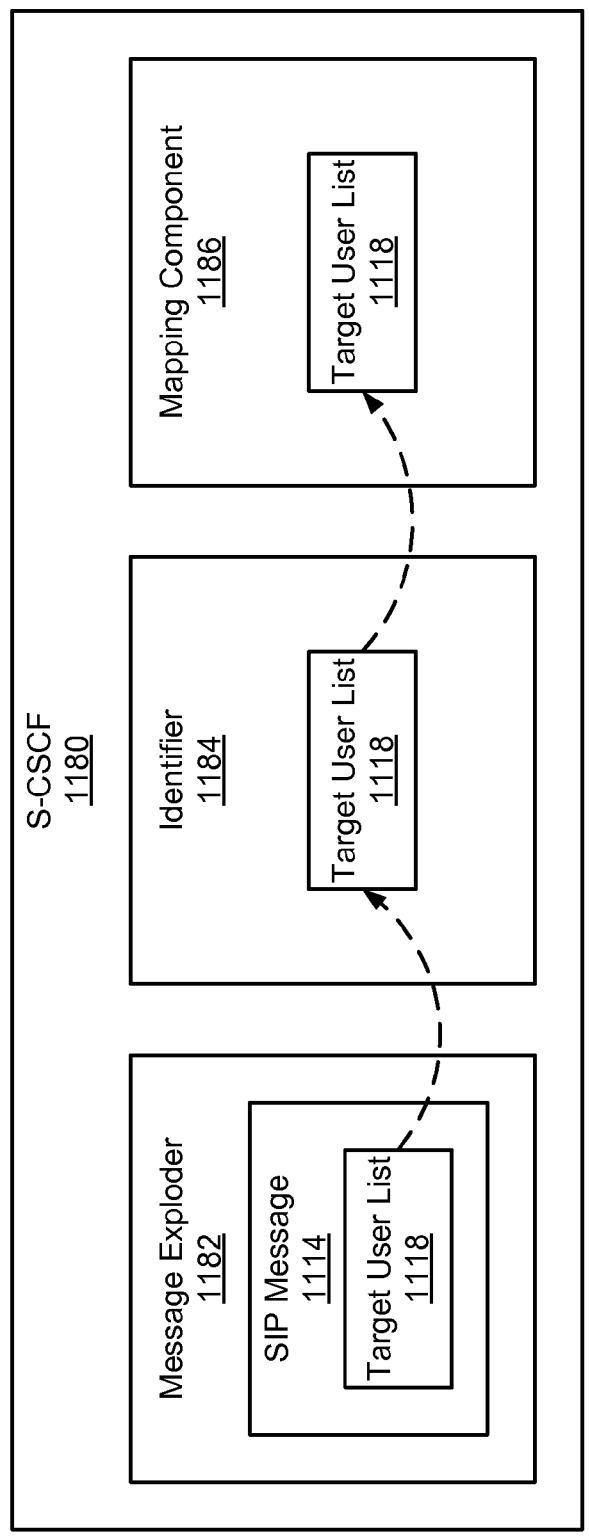
FIG. 11 is a block diagram illustrating one configuration of a servicing call session control function (S-CSCF)

FIG. 11 is a block diagram illustrating one configuration of the S-CSCF 1180. As previously stated, the S-CSCF 1180 may be a SIP server and may facilitate receiving and transmitting SIP messages including a SMS payload 216. In one configuration, the S-CSCF 1180 may also receive a list of pre-provisioned access terminals that may receive the SMS payload 216.

The S-CSCF 1180 may include a message exploder 1182. The message exploder 1182 may include a SIP message 1114. The SIP message 1114 may include a target user list 1118. The message exploder 1182 may explode the target user list 1118 and identifier 1184 may include the list 1118. The list 1118 may include the SMSGroupID 422 which is associated with a set of pre-provisioned access terminals. The SMS-GroupID 422 may indicate the group of access terminals that may receive the SMS payload 216. The identifier 1184 may associate the SMSGroupID 422 with the group of access terminals and transmit the list 1118 to a mapping component 1186. The mapping component 1186 may map the target user list 1118 to the SMS Group IP address 426 corresponding to the group of access terminals identified by the SMSGroup ID 422.

Figure 12:
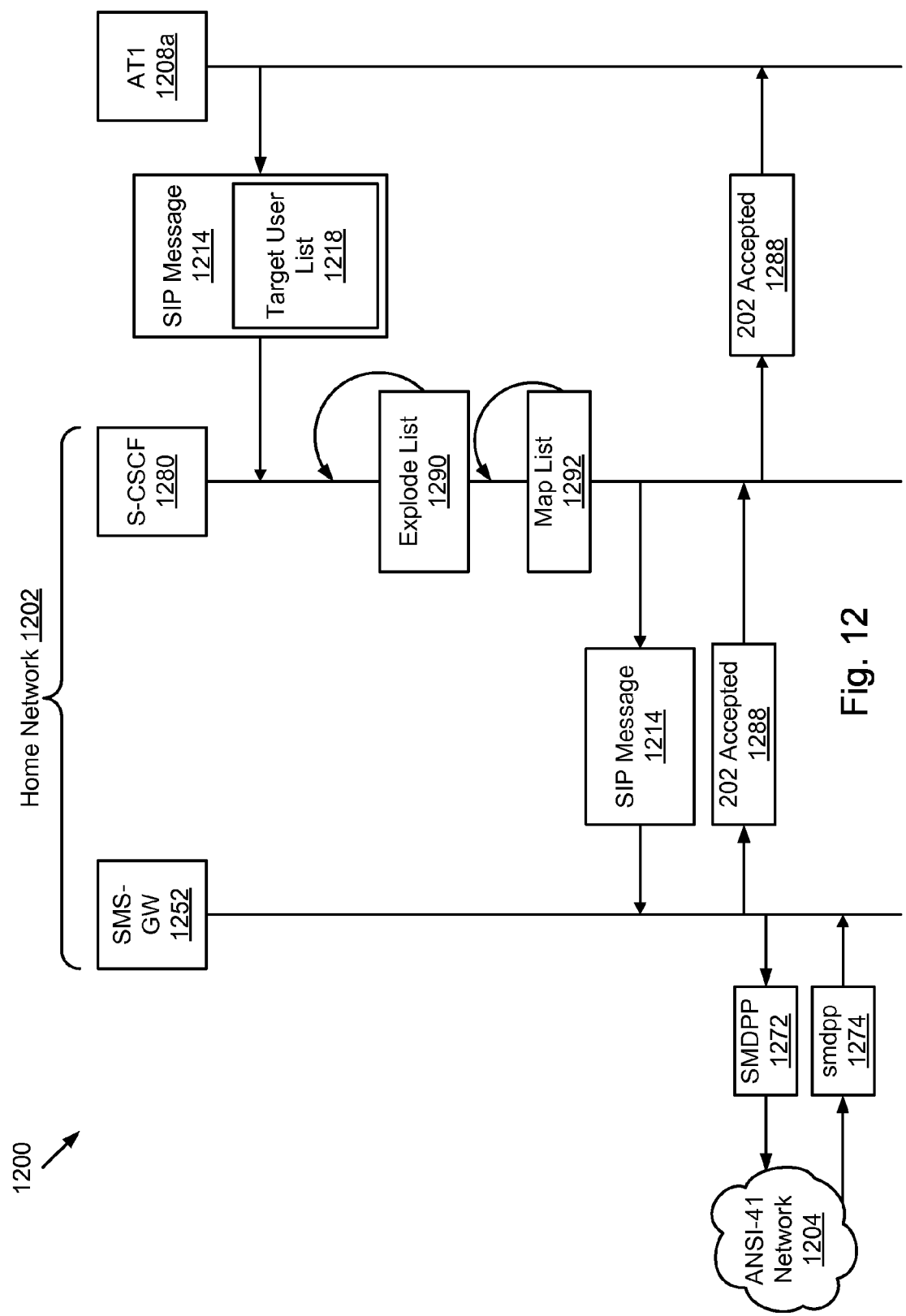
FIG. 12 is a thread diagram illustrating a further configuration of multicasting SMS data.

FIG. 12 is a further configuration of a thread diagram 1200 illustrating AT1 1208a multicasting a SIP message 1214 which may include the SMS payload 216. In one configuration, the SIP message 1214 may also include a target user list 1218 which may indicate the pre-provisioned group of access terminals the SMS payload 216 is to be sent to. AT1 1008a may multicast the SMS payload 216 to the AT group indicated by the list 1218 via the P-CSCF (not shown) and the S-CSCF 1280 associated with AT1 1208a. In one configuration, the content-type value associated with the SIP message 1214 may be "application/vnd.3gpp2.sms." The SMS payload 216 included within the SIP message 1214 may include a binary encoded SMS transport layer message as described in the 3GPP2 standards document, "3GPP2 C. S0015-0 v1.0."

In one configuration, the message exploder 1182 of the S-CSCF 1280 may explode 1290 the target user list 1218 from the SIP message 1214 in order to access the recipients of the multicast SMS payload 216. The S-CSCF 1280 may identify the SIP message 1214 as a multicast SMS payload 216 by evaluating the target user list 1218 included within the SIP message 1214. The S-CSCF 1280 may map the target user list 1218 to a pre-provisioned multicast IP address as explained in connection with the table 400 of FIG. 4.

The S-CSCF 1280 may modify the original SIP message 1214 sent from AT1 1208a by removing the target user list 1218. The S-CSCF 1280 may send the modified SIP message 1214 to the SMS-GW 1252 for delivery to the pre-provisioned multicast IP address mapped to the target user list 1218. In one configuration, the SMS-GW 1252 may respond by sending a SIP 202 Accepted message 1288 to AT1 1208a via the S-CSCF 1280 and the P-CSCF (not shown) associated with AT1 1208*a*. The SIP 202 Accepted message 1288 may be a SIP response sent by the recipient to indicate an acceptance of the message. In one configuration, the S-CSCF 1280 may forward the SIP 202 Accepted message 1288 to AT1 1208*a* via AT1's 1208*a* P-CSCF (not shown).

The SMS-GW 1252 may send a SMDPP message 1272 to the terminating SMS-GW (not shown for brevity). The SMDPP message 1272 may be transmitted over an ANSI-41 network 1204. The SMDPP message 1272 may include the SMS payload 216. The terminating SMS-GW may respond to the SMDPP message 1272 by sending a SMDPP response 1274 over the ANSI-41 network 1204 to indicate to the SMS-GW 1252 that the terminating SMS-GW received the SMDPP message 1272. In one configuration, the terminating SMS-GW may transmit the SMS payload 216 to a target UE as described in relation to FIG. 10.

Figure 13:
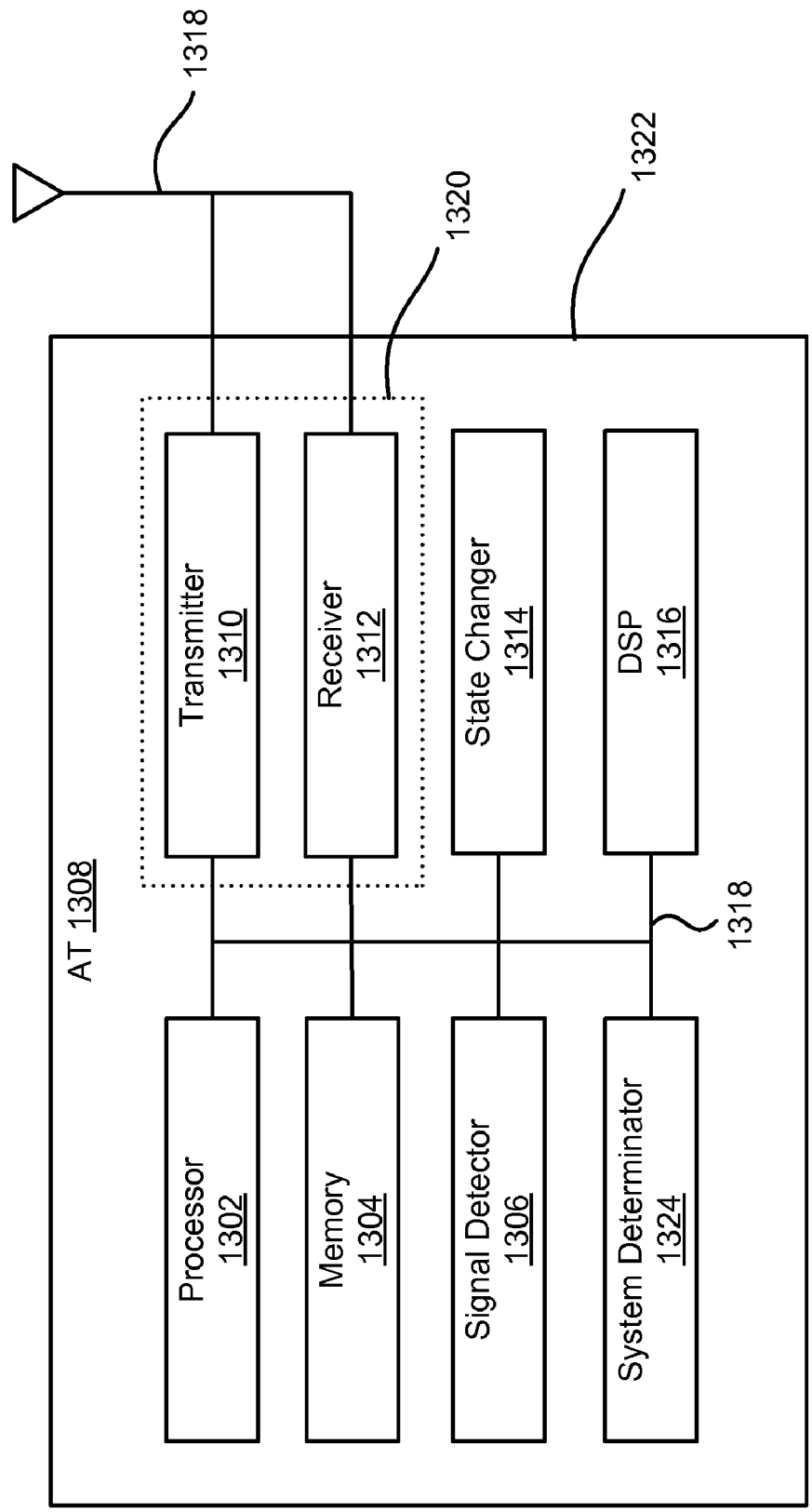
FIG. 13 illustrates various components that may be utilized in an access terminal in accordance with a configuration.

FIG. 13 illustrates various components that may be utilized in an access terminal 1308 in accordance with a configuration. The access terminal 1308 includes a processor 1302 which controls operation of the access terminal 1308. The processor 1302 may also be referred to as a CPU. Memory 1304, which may include both read-only memory (ROM) and random access memory (RAM), provides instructions and data to the processor 1302. A portion of the memory 1304 may also include non-volatile random access memory (NVRAM).

The access terminal 1308 may also include a housing 1322 that contains a transmitter 1310 and a receiver 1312 to allow transmission and reception of data between the access terminal 1308 and a remote location. The transmitter 1310 and receiver 1312 may be combined into a transceiver 1320. An antenna 1318 is attached to the housing 1322 and electrically coupled to the transceiver 1320.

The access terminal 1308 also includes a signal detector 1306 used to detect and quantify the level of signals received by the transceiver 1320. The signal detector 1306 detects such signals as total energy, pilot energy per pseudonoise (PN) chips, power spectral density, and other signals, as is known in the art.

A state changer 1314 of the access terminal 1308 controls the state of the access terminal 1308 based on a current state and additional signals received by the transceiver 1320 and detected by the signal detector 1306. The access terminal 1308 is capable of operating in any one of a number of states.

The access terminal 1308 also includes a system determinator 1324 used to control the access terminal 1324 and determine which service provider system the access terminal 1308 should transfer to when it determines the current service provider system is inadequate.

The various components of the access terminal 1308 are coupled together by a bus system 1318 which may include a power bus, a control signal bus, and a status signal bus in addition to a data bus. However, for the sake of clarity, the various busses are illustrated in FIG. 13 as the bus system 1318. The access terminal 1308 may also include a digital signal processor (DSP) 1316 for use in processing signals.

Figure 14:
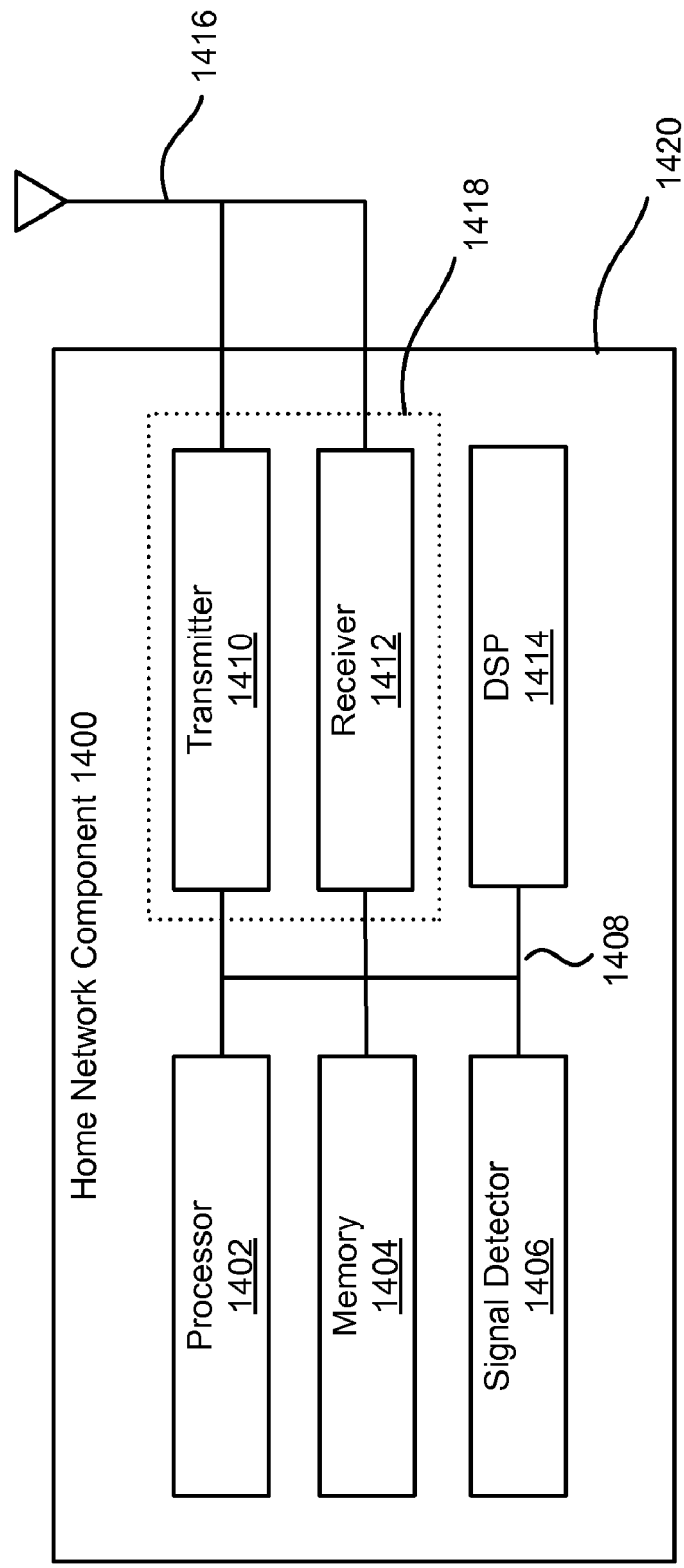
FIG. 14 is a functional block diagram illustrating one configuration of a home network component.

FIG. 14 is a functional block diagram illustrating a configuration of a home network component 1400. In one configuration, the home network component 1400 may include the SMS-GW 552, the HSS 1078 or the S-CSCF 1080. The home network component 1400 may include a processor 1402 which controls operation of the home network component 1400. The processor 1402 may also be referred to as a CPU. Memory 1404, which may include both read-only memory (ROM) and random access memory (RAM), provides instructions and data to the processor 1402. A portion of the memory 1404 may also include non-volatile random access memory (NVRAM).

The home network component 1400, may also include a housing 1420 that contains a transmitter 1410 and a receiver 1412 to allow transmission and reception of data, such as audio communications, between the home network component 1400 and a remote location, such as a mobile station 108. The transmitter 1410 and receiver 1412 may be combined into a transceiver 1418. An antenna 1416 is attached to the housing 1420 and electrically coupled to the transceiver 1418. Additional antennas (not shown) may also be used. The operation of the transmitter 1410, receiver 1412 and antenna 1416 is well known in the art and need not be described herein.

The home network component 1400 also includes a signal detector 1406 used to detect and quantify the level of signals received by the transceiver 1406. The signal detector 1406 detects such signals as total energy, pilot energy per pseudonoise (PN) chips, power spectral density, and other signals, as is known in the art. The signal detector 1406 may also be used to detect a SIP message 214.

The various components of the home network component 1400 are coupled together by a bus system 1408 which may include a power bus, a control signal bus, and a status signal bus in addition to a data bus. However, for the sake of clarity, the various busses are illustrated in FIG. 14 as the bus system 1408. The home network component 1400 may also include a digital signal processor (DSP) 1414 for use in processing signals. The home network component 1400 illustrated in FIG. 14 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present systems and methods. In other words, unless a specific order of steps or actions is specified for proper operation of the configuration, the order and/or use of specific steps and/or actions may be modified without departing from the scope of the present systems and methods.

While specific configurations and applications of the present systems and methods have been illustrated and described, it is to be understood that the systems and methods are not limited to the precise configuration and components disclosed herein. Various modifications, changes, and variations which will be apparent to those skilled in the art may be made in the arrangement, operation, and details of the methods and systems disclosed herein without departing from the spirit and scope of the claimed systems and methods.

What is claimed is:

1. A method for broadcasting a short message service (SMS) payload, comprising:
   receiving at a receiver, a SIP message having encapsulated therein an SMS payload and a target SMS user list, the target SMS user list indicating a group of mobile stations to which the SMS payload is to be sent, the group of mobile stations being associated with a group identifier;
   exploding the target SMS user list;
   consulting a static table to map the target SMS user list to a multicast IP address associated with the group identifier;
   modifying the SIP message by removing the target user list;
   generating a modified SIP message addressed to the multicast IP address; and
   transmitting the modified SIP message to a broadcast base station controller (BBCS) for creating a new broadcast flow for broadcasting the SMS payload and allocating only a single channel for broadcasting the SMS payload to the group of mobile stations.

2. The method of claim 1, wherein each mobile station in the group of mobile stations is pre-provisioned to the multicast IP address.

3. The method of claim 1, wherein an ANSI-41 network sends the SMS payload to a home network.

4. The method of claim 1, wherein the BBSC broadcasts a broadcast overhead message (BOM) comprising broadcast multicast service flow identification (BCMCS Flow ID) and channel information.

5. The method of claim 1, further comprising verifying if the BBSC is registered on an IP Multimedia subsystem (IMS).

6. The method of claim 1, wherein the new broadcast flow includes a BCMCS Flow ID identifying the multicast IP address associated with the group identifier.

7. The method of claim 1, further comprising:
   extracting the SMS payload from the SIP message;
   encapsulating the extracted SMS payload into a broadcast message; and
   broadcasting the encapsulated SMS payload to each mobile station in the group of mobile stations over the single allocated channel using the created broadcast flow.

8. The method of claim 7, further comprising broadcasting the SMS payload to the plurality of mobile stations using code division multiple access 1× evolution data optimization (CDMA 1×EV-DO).

9. A non-transitory computer readable medium having stored thereon a set of instructions executable to:
   receive a session initiation protocol (SIP) message having encapsulated therein an SMS payload and a target SMS user list, the target SMS user list indicating a group of mobile stations to which the SMS payload is to be sent, the group of mobile stations being associated with a group identifier; explode the target SMS user list;
   consult a static table to map the target SMS user list to a multicast IP address associated with the group identifier;
   modify the SIP message by removing the target user list;
   generate a modified SIP message addressed to the multicast IP address; and
   transmit the modified SIP message to a broadcast base station controller (BBSC) for creating a new broadcast flow for broadcasting the SMS payload and allocating only a single channel for broadcasting the SMS payload to the group of mobile stations.

10. The non-transitory computer readable medium of claim 9, wherein the new broadcast flow includes a BCMCS Flow ID identifying the multicast IP address associated with the group identifier.

11. The non-transitory computer readable medium of claim 9, wherein the instructions are further executable to:
    extract the SMS payload from the SIP message;
    encapsulate the extracted SMS payload into a broadcast message; and
    broadcast the encapsulated SMS payload to each mobile station in the group of mobile stations over the single allocated channel using the created broadcast flow.

12. The non-transitory computer readable medium of claim 11, wherein the instructions are further executable to use code division multiple access 1× evolution data optimization (CDMA 1×EV-DO) to broadcast the SMS payload to the plurality of mobile stations.

13. A system that is configured to broadcast a short message service (SMS) payload comprising:
    means for receiving a SIP message having encapsulated therein an SMS payload and a target SMS user list indicating a group of mobile stations to which the SMS payload is to be sent, the group of mobile stations being associated with a group identifier;
    means for exploding the target SMS user list;
    means for consulting a static table to map the target SMS user list to a multicast IP address associated with the group identifier;
    means for modifying the SIP message by removing the target user list;

means for generating a modified SIP message addressed to the multicast IP address; and means for transmitting the modified SIP message to a broadcast base station controller (BBCS) for creating a new broadcast flow for broadcasting the SMS payload and allocating only a single channel for broadcasting the SMS payload to the group of mobile stations.

* * * * *